Patented Nov. 10, 1942

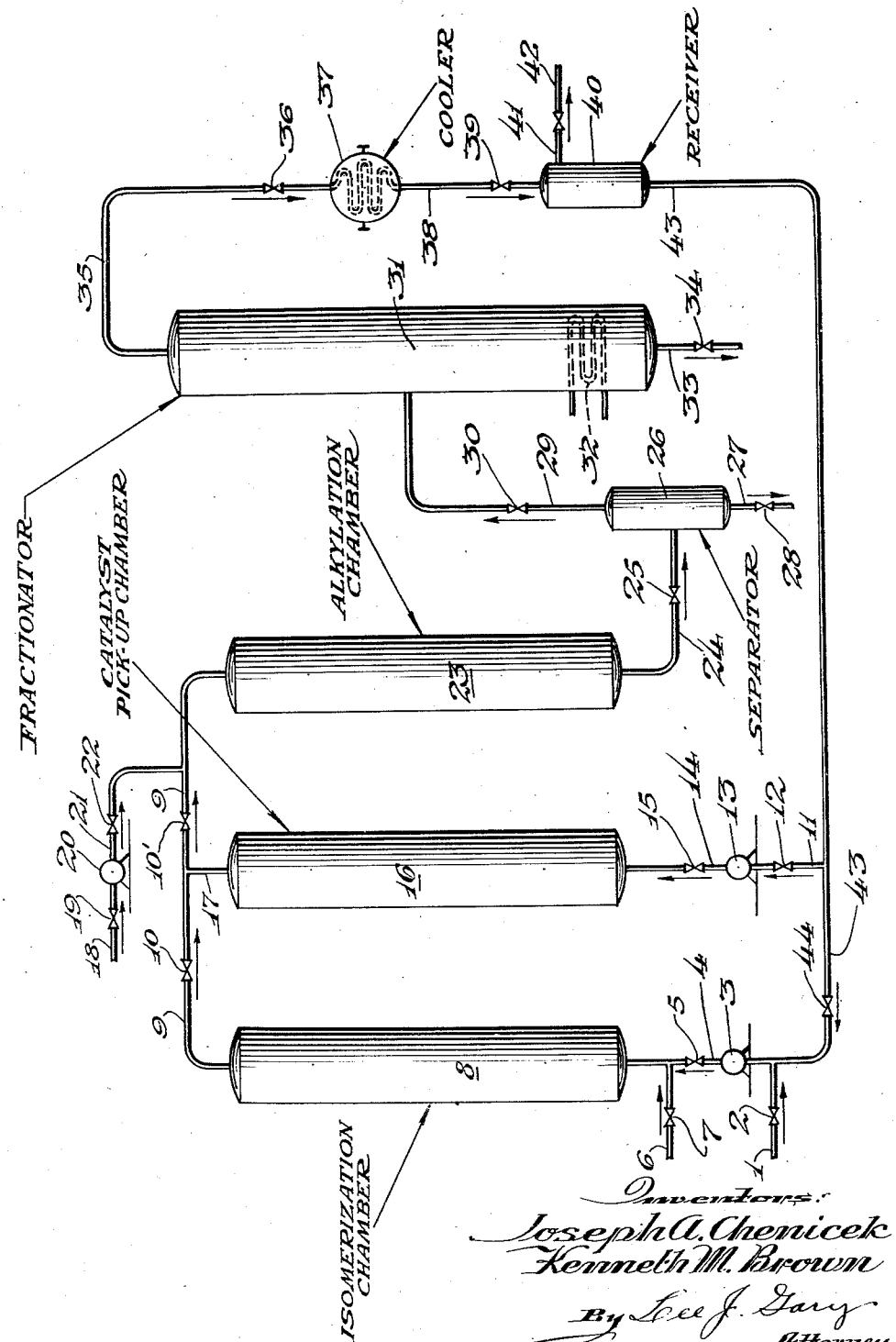

2,301,615

UNITED STATES PATENT OFFICE 2,301,615

TREATMENT OF HYDROCARBONS

Joseph A. Chenicek and Kenneth M. Brown, Chicago, Ill., assignors to Universal Oil Products Company, Chicago, Ill., a corporation of Delaware Application October 15, 1941, Serial No. 415,018

7 Claims. (Cl. 196—10)

This invention relates to an improved combination isomerization-alkylation process in which normal butane is first isomerized to isobutane and is then alkylated with an olefin to produce branched chain liquid hydrocarbons.

It has previously been proposed to carry out an isomerization-alkylation process by passing a normal butane charge together with recycled butane and isobutane first through a bed of granular aluminum chloride where part of the normal butane is isomerized to isobutane and where some of the aluminum chloride is dissolved in the hydrocarbon mixture. The resulting mixture together with an added olefin is then passed over a bed of packing material where the aluminum chloride is deposited on the packing material to act as a catalyst for the alkylation reaction. The concentration of aluminum chloride in the incoming reactants is relatively low while it is relatively high on the packing material in the reaction zone. The bed of aluminum chloride through which all of the reactants except the olefins pass, has a double function. It serves as a catalyst pick up zone and it also serves as an isomerization zone. In order to pick up the aluminum chloride catalyst the contact time in the pick up zone need not be very long but for the isomerization reaction a much longer time is needed.

The nature of the alkylation reaction requires a relatively high ratio of isoparaffin to olefin in the reaction zone. A suitable ratio is usually between 2 to 1 and 20 to 1. One economical way to maintain this high ratio of isoparaffin to olefin is to recycle the unused isoparaffin to the beginning of the process. Since the aluminum chloride has a limited solubility in the hydrocarbon reactants at the temperatures which may be used in the catalyst pick-up zone without the occurrence of undesirable side reaction, it is necessary to pass a considerable portion of the reactants through a catalyst pick-up zone prior to their entry to the alkylation zone in order to maintain a sufficiently high catalyst activity on the surface of the packing material to carry out the alkylation reaction. As all the hydrocarbon reactants passing through the catalyst pick-up zone must remain in that zone long enough to carry out the isomerization reactions also, a very large catalyst pick-up and isomerization zone is needed.

In the improved process of the present invention, two zones are provided. One zone, which contains a suitable isomerization catalyst, functions mainly as an isomerization zone and receives only a minor portion of the reactants. The other zone which contains granulated aluminum chloride, will receive a major portion of the recycled reactants and will act primarily as a catalyst pick-up zone.

One specific embodiment of the present invention comprises a process for isomerizing and alkylating a paraffin hydrocarbon with an olefin hydrocarbon which comprises passing a minor portion of the reactants including the paraffin charge and a small amount of hydrogen chloride through an isomerization zone at isomerization conditions, passing a major proportion of the reactants comprising recycled unreacted material through an aluminum chloride pick-up zone under conditions at which sufficient aluminum chloride is dissolved in said reactants to maintain the catalyst activity in a subsequent alkylation reaction zone, combining the above mentioned portions of reactants with a separate stream of olefins in a proportion to maintain an excess of isoparaffin in the combined stream and directing said combined stream to a packed reaction zone where the aluminum chloride is deposited on the surface of the packing material and alkylation of the isoparaffins with olefins is carried out, withdrawing and separating the reaction products into an alkylated product and unreacted material, and returning at least a part of said unreacted material to said isomerization and catalyst pick-up zones.

The conditions for the isomerization reaction will, of course, vary, depending upon the paraffin employed in the reaction. For normal butane, the temperature in the isomerization zone may be in the general range of about 125° F. to 250° F., with a preferred range of between 150 and 225° F. Reaction time is best expressed in terms of space velocity defined as volumes of liquid feed per volume of catalyst space per hour. A space velocity of about 0.25 has been found to be satisfactory to obtain a 50% conversion of butane to isobutane at approximately 190° F. The space velocity may, however, vary considerably depending upon the temperature and composition of the charge. The isomerization reaction may be carried out in either the vapor or liquid phase. Vapor phase isomerization has an advantage in that a smaller amount of aluminum chloride catalyst is carried out of the reaction zone with the reaction products since the catalyst is lost by vaporization rather than by solution. The liquid phase operation has an advantage in the present process, however, since a greater conversion of n-paraffin to isoparaffin is obtained per pass through the isomerization zone at given conditions of temperature and hydrogen chloride concentration.

The catalyst pick-up zone can be operated at a much higher space velocity than the isomerization zone. It is only necessary that the hydrocarbons remain in the catalyst pick-up zone long enough to dissolve the required amount of aluminum chloride. At a given space velocity a higher temperature will, of course, give a higher rate of solution and a higher concentration of dissolved catalyst. Although an extensive range of temperatures may be used in the pick-up zone, it has been found satisfactory to employ a temperature in the range between about 125° and about 250° F.

In the alkylation zone, the hydrocarbon charge containing olefin, isoparaffin, dissolved catalyst, and a small amount of hydrogen chloride is passed over a solid granular packing material such as quartz, porcelain, etc., on the surface of which aluminum chloride deposits. In this manner, a relatively high concentration of catalyst is maintained in the reaction zone although the charge contains a rather low concentration of fresh catalyst. The used catalyst sludge gradually runs down through the packed reaction zone and is collected in and withdrawn from a succeeding separation zone. Suitable conditions for the alkylation reaction will also vary depending upon the reactants. In the alkylation of isobutane a suitable temperature will be within the range of —50° to 160° F. Generally speaking, the lower portion of this temperature range will be more suitable when alkylating with butenes or isobutene and the higher portion when employing propene and ethylene.

Although the difference between the isomerization and catalyst pick-up zones has been emphasized, it must be understood that each, in a measure, will perform the functions of the other. The isomerization zone, particularly, when operated in the liquid phase will also carry over into the alkylation zone a portion of the catalyst necessary for the alkylation reaction. The catalyst pick-up zone will also act as an isomerization zone to a limited extent, although rather low conversions will result from the relatively short contact time and relatively high concentration of isoparaffin in the recycle stock and the fact that little or no hydrogen chloride will be present.

For illustrative purposes there is shown in the accompanying drawing a diagrammatic flow sheet in conventional side elevation representing one specific process adapted to carry out the invention.

Referring to the drawing, the hydrocarbon charge consisting essentially of normal butane enters through line 1, valve 2, pump 3, line 4, and valve 5 to isomerization chamber 8. A stream of anhydrous hydrogen chloride is introduced under pressure to line 4 through line 6 and valve 7. In the isomerization chamber 8, the stream of reactants may pass through a bed of granular aluminum chloride or any suitable isomerization catalyst at a space velocity of about 0.25 and a temperature of about 190° F. maintained by preheating the normal butane charge. Approximately 50% of the reaction products leaving isomerization chamber 8 is isobutane. The reaction products from isomerization chamber 8 pass through line 9 and valve 10. Another stream of reactants recycled from the products of the process, as will be described later, is withdrawn from line 43 through line 11, valve 12, and pump 13 and introduced through line 14 and valve 15 to catalyst pick-up chamber 16. This stream of recycled reactants will contain normal butane and isobutane as well as some dissolved hydrogen chloride. The catalyst pick-up chamber also contains a bed of granular aluminum chloride and is operated at about 140–200° F. The space velocity is much higher, however, than in the isomerization chamber since it is only necessary for the hydrocarbons to remain in the catalyst pick-up chamber long enough to dissolve the required amount of aluminum chloride catalyst.

The catalyst-laden stream from catalyst pick-up chamber 16 passes through line 17 where it is combined in line 9 with the stream of reactants from isomerization chamber 8. The combined stream passed through valve 10' is then further combined with a stream of hydrocarbons consisting essentially of ethylene and ethane, introduced through line 18, valve 19, pump 20, line 21 and valve 22. The total combined stream entering alkylation chamber 23 will contain essentially normal butane, isobutane, anhydrous hydrogen chloride, dissolved aluminum chloride, ethylene, and ethane. The aluminum chloride in the presence of the olefin deposits on the surface of a packing material in alkylation chamber 23 and the alkylation of the isobutane with ethylene is carried out in the presence of this deposited catalyst. The reaction products from alkylation chamber 23 pass through line 24 and valve 25 to separator 26 where used catalyst sludge is separated from the hydrocarbon reaction products and is withdrawn through line 27 and valve 28. The hydrocarbon reaction products pass through line 29 and valve 30 to fractionator 31. A heating coil 32 in the bottom of fractionator 31 supplies the heat necessary for fractional distillation.

In the fractionator, the reaction products are separated into two streams. From the bottom of fractionator 31, a product consisting essentially of an alkylate is withdrawn through line 33 and valve 34. The rest of the stream entering fractionator 31 comprising normal butane, isobutane, ethane, and anhydrous hydrogen chloride passes overhead through line 35, valve 36, cooler 37, line 38, and valve 39 to receiver 40. The uncondensed gases consisting essentially of ethane and hydrogen chloride are withdrawn through line 41 and valve 42. The liquid in receiver 40 which will consist essentially of isobutane and normal butane is withdrawn through line 43 and returned to the process in two streams. The major portion of the recycled stream returns through line 11, etc., as described previously to the catalyst pick up chamber while a smaller portion passes through line 43 and valve 44 to line 1 where it is combined with the charge. This small stream of recycle material is returned to the isomerization chamber to prevent the building up of too high a concentration of normal butane in the recycle stream. The hydrogen chloride withdrawn from receiver 40 to line 41 and valve 42 may be separated from the ethane by means not shown in the illustration and returned to the process through line 6 and valve 7.

The following example is given to indicate the type results that may be expected when employing the process of this invention. It is not intended, however, that the invention should be limited by the results shown in the example.

The charge to the process was normal butane. The isomerization zone was operated at 180° F., 0.25 space velocity, and 250 pounds per square inch pressure. 3.2 mol per cent of dry hydrogen chloride was added to the charge at the isomerization zone. The reaction products from the isomerization zone contained 59% isobutane. The recycle material which was contacted with aluminum chloride in the catalyst pick up zone at 180° F., was added together with the products of the isomerization zone and 15 mol per cent of ethylene to the alkylation zone, operated at 105° F. An analysis of the reaction products from the alkylation zone indicated approximately 47 volume per cent of $C_6$ product and a yield of $C_5$ and greater representing a 196 weight per cent of the ethylene charge. The product had an octane number of 89 by the A. S. T. M. motor method.

We claim as our invention:

1. A process for the production of saturated branched chain hydrocarbons from normal-paraffins and normal or branched chain olefins which comprises passing a normal paraffin charge and a lesser portion of recycled hydrocarbons from a source hereinafter described, together with a relatively small amount of hydrogen chloride through an isomerization zone at isomerizing conditions, passing a greater portion of said recycled hydrocarbons through an aluminum chloride catalyst pick-up zone under conditions at which sufficient aluminum chloride is dissolved in said recycled hydrocarbons to maintain catalyst activity in a subsequent alkylation reaction zone, combining the products of said isomerization and catalyst pick-up zones with a separate stream of olefins in a proportion to maintain an excess of isoparaffin in the combined stream, passing said combined stream through an alkylation zone wherein the aluminum chloride catalyst deposits on the surface of a solid granular packing material and wherein isoparaffins are alkylated with olefins, withdrawing and separating the hydrocarbon reaction products into alkylated hydrocarbons and unreacted hydrocarbons and returning at least a part of said unreacted hydrocarbons to said isomerization and catalyst pickup zones, as said recycled hydrocarbons hereinbefore set forth.

2. A process for the production of saturated branched chain hydrocarbons from normal-butane and ethylene which comprises passing a normal butane charge and a lesser portion of recycled hydrocarbons from a source hereinafter described, together with a relatively small amount of hydrogen chloride through an isomerization zone at isomerizing conditions, passing a greater portion of said recycled hydrocarbons through an aluminum chloride catalyst pick up zone under conditions at which sufficient aluminum chloride is dissolved in said recycled hydrocarbons to maintain the catalyst activity in a subsequent alkylation reaction zone, combining the products of said isomerization and catalyst pick up zones with another hydrocarbon stream containing ethylene, in a proportion to maintain an excess of isobutane in the combined stream, passing said combined stream through an alkylation zone wherein the aluminum chloride catalyst deposits on the surface of a solid granular packing material and wherein isobutane is alkylated with the ethylene, withdrawing and separating the hydrocarbon reaction products into alkylated hydrocarbons and unreacted hydrocarbons, and returning at least a part of said unreacted hydrocarbons to said isomerization and catalyst pick up zones.

3. A process for the production of saturated branched chain hydrocarbons from normal-butane and an olefin containing gas which comprises passing a normal butane charge and a lesser portion of recycled hydrocarbons from a source hereinafter described, together with a relatively small amount of hydrogen chloride through an isomerization zone at isomerizing conditions, passing a greater portion of said recycled hydrocarbons through an aluminum chloride catalyst pick up zone under conditions at which sufficient aluminum chloride is dissolved in said recycled hydrocarbons to maintain the catalyst activity in a subsequent alkylation reaction zone, combining the products of said isomerization and catalyst pick up zones with another hydrocarbon stream containing olefins, in a proportion to maintain an excess of isobutane in the combined stream, passing said combined stream through an alkylation zone wherein the aluminum chloride catalyst deposits on the surface of a solid granular packing material and wherein isobutane is alkylated with the olefins, withdrawing and separating the hydrocarbon reaction products into alkylated hydrocarbons and unreacted hydrocarbons, and returning at least a part of said unreacted hydrocarbons to said isomerization and catalyst pick up zones.

4. A process for the production of saturated branched chain hydrocarbons from normal-pentane and an olefin containing gas which comprises passing a normal pentane charge and a lesser portion of recycled hydrocarbons from a source hereinafter described, together with a relatively small amount of hydrogen chloride through an isomerization zone at isomerizing conditions, passing a greater portion of said recycled hydrocarbons through an aluminum chloride catalyst pick up zone under conditions at which sufficient aluminum chloride is dissolved in said recycled hydrocarbons to maintain the catalyst activity in a subsequent alkylation reaction zone, combining the products of said isomerization and catalyst pick up zones with another hydrocarbon stream containing olefins, in a proportion to maintain an excess of isopentane in the combined stream, passing said combined stream through an alkylation zone wherein the aluminum chloride catalyst deposits on the surface of a solid granular packing material and wherein isopentane is alkylated with the olefins, withdrawing and separating the hydrocarbon reaction products into alkylated hydrocarbons and unreacted hydrocarbons, and returning at least a part of said unreacted hydrocarbons to said isomerization and catalyst pick up zones.

5. A process for producing saturated branched chain hydrocarbons which comprises passing a paraffinic charge together with hydrogen chloride through an isomerizing zone and therein isomerizing a substantial portion of the charge in the presence of aluminum chloride, simultaneously passing recycled hydrocarbons through an aluminum chloride pick-up zone under conditions such as to carry out of the pick-up zone in said recycled hydrocarbons a sufficient quantity of aluminum chloride to maintain catalyst activity in a subsequent catalytic alkylation zone, commingling the products from the isomerizing zone with the aluminum chloride-containing recycled hydrocarbons from the pick-up zone and with olefin hydrocarbons in proportion to provide an excess of isoparaffin to olefin hydrocarbons in the commingled materials, passing the mixture thus formed through said catalytic alkylation zone and therein reacting olefin with isoparaffin hydrocarbons in the presence of aluminum chloride, separating resultant alkylate from unreacted paraffins and supplying at least a portion of the latter to the pick-up zone as said recycled hydrocarbons.

6. The process as defined in claim 5 further characterized in that said alkylation zone contains a solid granular packing material upon which is deposited aluminum chloride carried out of the pick-up zone in said recycled hydrocarbons.

7. The process as defined in claim 5 further characterized in that said paraffinic charge comprises normal butane.

JOSEPH A. CHENICEK.
KENNETH M. BROWN.